(12) United States Patent
Gordon (10) Patent No.: US 6,396,479 B2
(45) Date of Patent: May 28, 2002

(54) ERGONOMIC COMPUTER MOUSE

(75) Inventor: Gary B. Gordon, Saratoga, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/809,571

(22) Filed: Mar. 14, 2001

Related U.S. Application Data (63) Continuation of application No. 09/127,225, filed on Jul. 31, 1998, now abandoned.

(51) Int. Cl.[7] .................................................. G09G 5/08
(52) U.S. Cl. ....................................... 345/163; 345/156
(58) Field of Search ................................ 345/163, 157, 345/156, 166; 463/37

(56) References Cited

U.S. PATENT DOCUMENTS

| | | | |
|---|---|---|---|
| 5,576,733 A | * 11/1996 | Lo | 345/163 |
| 5,880,715 A | * 3/1999 | Garrett | 345/163 |
| 5,894,302 A | * 4/1999 | Scenna et al. | 345/163 |
| 6,072,471 A | * 6/2000 | Lo | 345/163 |

\* cited by examiner

*Primary Examiner*—Bipin Shalwala
*Assistant Examiner*—Ricardo Osorio
(74) *Attorney, Agent, or Firm*—Edward L. Miller (57) ABSTRACT

An ergonomic mouse that alleviates mouse RSI is obtained by gripping the mouse with a pinching action between the thumb and opposing fingers while the mouse is in the U-shaped opening formed in the hand when in a neutral and unflexed condition with the little finger and the heel of the palm opposite the thumb resting upon a work surface. The mouse has two gripping surfaces; one receives the thumb and the other the opposing fingers. Indentations in the gripping surfaces help locate the finger tips. Mouse buttons are located in the indentations. The gripping surfaces are inclined toward each other, so that the pinching action to actuate the mouse buttons produces a slight downward force toward a base surface that rests upon and slides over the work surface. The little finger is allowed to drag on the work surface to assist in fine positioning. Preferably, the mouse utilizes an optical motion sensing technique instead of the conventional rubber coated steel ball.

9 Claims, 7 Drawing Sheets

ERGONOMIC COMPUTER MOUSE

REFERENCE TO RELATED APPLICATION AND INCORPORATION BY REFERENCE

This is a Continuation of an earlier filed application Ser. No. 09/127,225, filed on Jul. 31, 1998 with the same Title, and which is now abandoned.

The present Application concerns a computer mouse whose preferred internal mechanism for sensing motion is an optical technique described by previously filed U.S. Patent Applications assigned to Hewlett-Packard Co. While such optical sensing of motion is perhaps not essential, it certainly is the case that the conventional mechanism of a rubber coated steel ball coupled to encoders is simply physically too large to easily fit into a mouse of the relatively small size contemplated by this application. A technique requiring less space is desirable. Other advantages accrue as well, such as absence of the need for a mouse pad, etc. For these reasons the following U.S. Patent Application is hereby incorporated herein by reference: "SEEING EYE" MOUSE FOR A COMPUTER SYSTEM, Ser. No. 09/052,046, filed on Mar. 30, 1998 by Gary B. Gordon. That Application in turn incorporates two issued U.S. Pat. Nos. (5,578,813 and 5,644,139) and a U.S. application (Ser. No. 08/540,335), each of which are thus by implication also incorporated herein by reference.

BACKGROUND OF THE INVENTION

For many computer users the conventional mouse is an invitation to experience Repetitive Strain Injury Syndrome, or RSI. RSI is a well documented and recognized medical condition, and RSI from using a conventional computer mouse is understood to affect a significant percentage of the workforce that uses computers. See, for example the book entitled *Repetitive Strain Injury A Computer User's Guide* by Emil Paccarelli, M.D., and Deborah Quilter (ISBN 0-471-59533-0, John Wiley & Sons Inc., 1994) On page 167 they lay the blame for many serious cases of RSI on the use of a computer mouse. We shall term such injuries (and they are nothing less than genuine injuries) "mouse RSI".

In simple terms, the primary cause of mouse RSI is the unnatural inwardly rolled position of the hand (palm parallel to the desk top) required by the shape of a conventional mouse and the location of the buttons, or finger actuated controls, thereon. A more neutral position is one where the palm of the hand and wrist are 45° to 90° less twisted. Continued unnatural twisting causes the tendons to assume contorted paths and subsequently chafe in their sheaths. The conventional "bar of soap" mouse, with its side-by-side horizontally aligned keys, forces an extreme unnatural position of the hand.

This problem has not gone unrecognized by mouse designers and manufacturers. There are a number of mouse products that have been brought to market that have attempted to alleviate mouse RSI. There have been pistol grip designs. These do not require an unnatural hand position, but are notorious for lack of ease in fine positioning of the screen pointer, owing to the fact that both wrist and arm motions are needed, rather than allowing the heel of the palm to anchor fine motions of the fingers. Track balls tend to require the same or nearly the same amount of unnatural twisting as does a conventional mouse. A stylus for a tablet is generally easily and naturally held, but is inefficient to lay down and pick up again. Also, buttons or keys located on a stylus are usually not convenient to actuate.

Accordingly, it would be highly desirable if there were a computer pointing device that matches the conventional computer mouse in functionality (ease of fine positioning, free standing, etc.), but that is gripped in a more natural and in a less or non-damaging way, so as to reduce or eliminate any mouse RSI associated with its use.

SUMMARY OF THE INVENTION

An ergonomic mouse that alleviates mouse RSI is obtained by gripping the mouse with a pinching action between the thumb and opposing fingers while the mouse is in the U-shaped opening formed in the hand when in a neutral and unflexed condition with the little finger and the heel of the palm opposite the thumb resting upon a work surface. The mouse has two gripping surfaces; one receives the thumb and the other the opposing fingers. Indentations in the gripping surfaces help locate the finger tips. Mouse buttons are located in the indentations. The gripping surfaces are inclined toward each other, so that the pinching action to actuate the mouse buttons produces a slight downward force toward a base surface that rests upon and slides over the work surface. This acts to provide stability as the mouse buttons are pressed. The third and the fourth (little) finger may be allowed to drag on the work surface to provide tactile feedback and assist in fine positioning. Preferably, the mouse utilizes an optical motion sensing technique instead of the conventional rubber coated steel ball.

DESCRIPTION OF A PREFERRED EMBODIMENT

Figure 1:
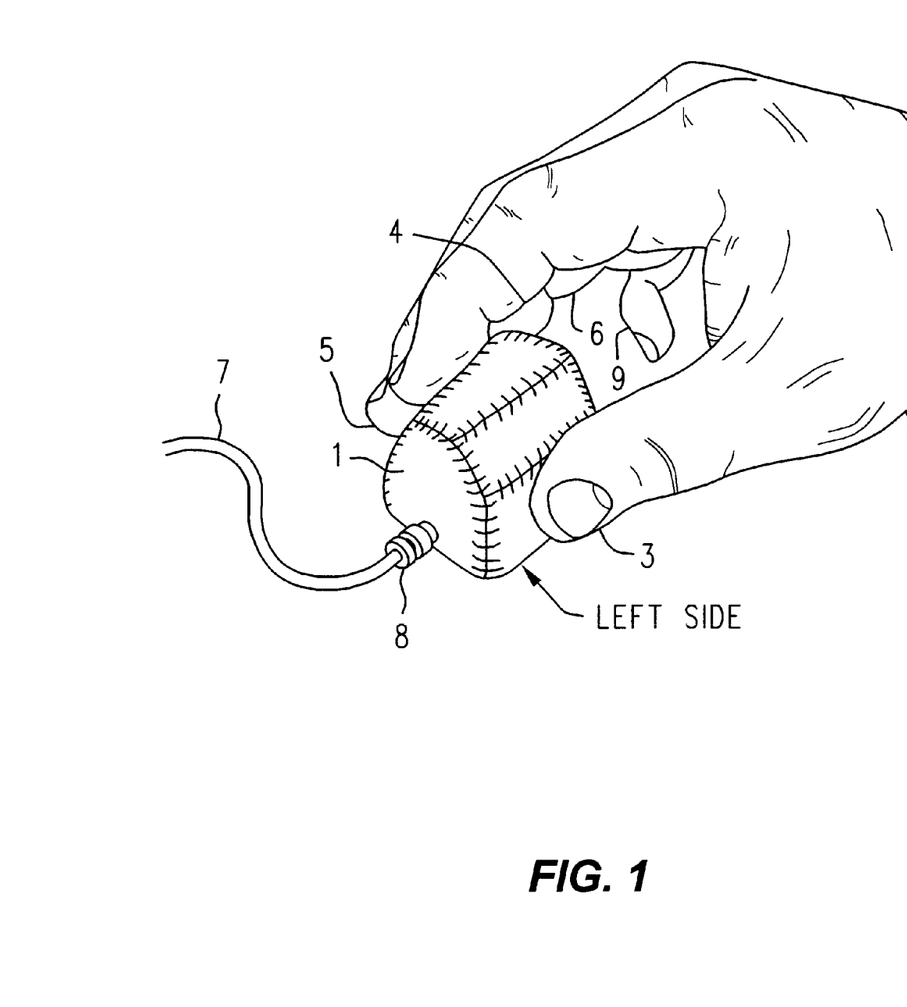
FIG. 1 is a perspective view of a right hand holding an ergonomic mouse constructed in accordance with the invention.

Refer now to FIG. 1, wherein is shown a perspective view of a right human hand 2 holding an ergonomic computer mouse 1. In this particular instance the mouse 1 is corded; that is, it has a strain relief 8 and an electrical cable 7 that is connected at a distant end to a computer (not shown). It will be appreciated that a wireless version of the mouse 1 falls within the scope of the present disclosure.

To continue, note that the thumb 3 grips one side of the mouse 1, while the index finger 4, middle finger 5 and third finger 6 grip the mouse 1 from an opposing side. Although it is not explicitly depicted in the figure, the mouse 1 is resting on a work surface, such as a desk top. The right edge of the palm of hand 2 is also resting on that work surface, as is at least the last joint of the little finger 9.

Compared to a conventional computer mouse, ergonomic mouse 1 is small, being intended to fit within the unflexed U-shaped opening formed between a neutrally positioned thumb 3 and opposing index finger 4 and middle finger 5. Some representative dimensions of the ergonomic mouse 1 will be given in conjunction with other figures. In a typical adult this U-shaped opening is generally about one and a half inches across.

As will be understood from an appreciation of subsequent figures, the tip of thumb 3 is resting in an indentation that is not easily depicted in FIG. 1. Likewise, the tip of third finger 6 is resting in an indentation. The tips of fingers 4 and 5 rest in indentations that also contain push buttons or electrical switches that can be activated by pressure from those fingers.

It is clear from the foregoing that the ergonomic mouse 1 is a right handed version for use by the right hand. It is equally clear that the ergonomic mouse 1 could also be produced as a left handed version for use by the left hand.

Figure 2:
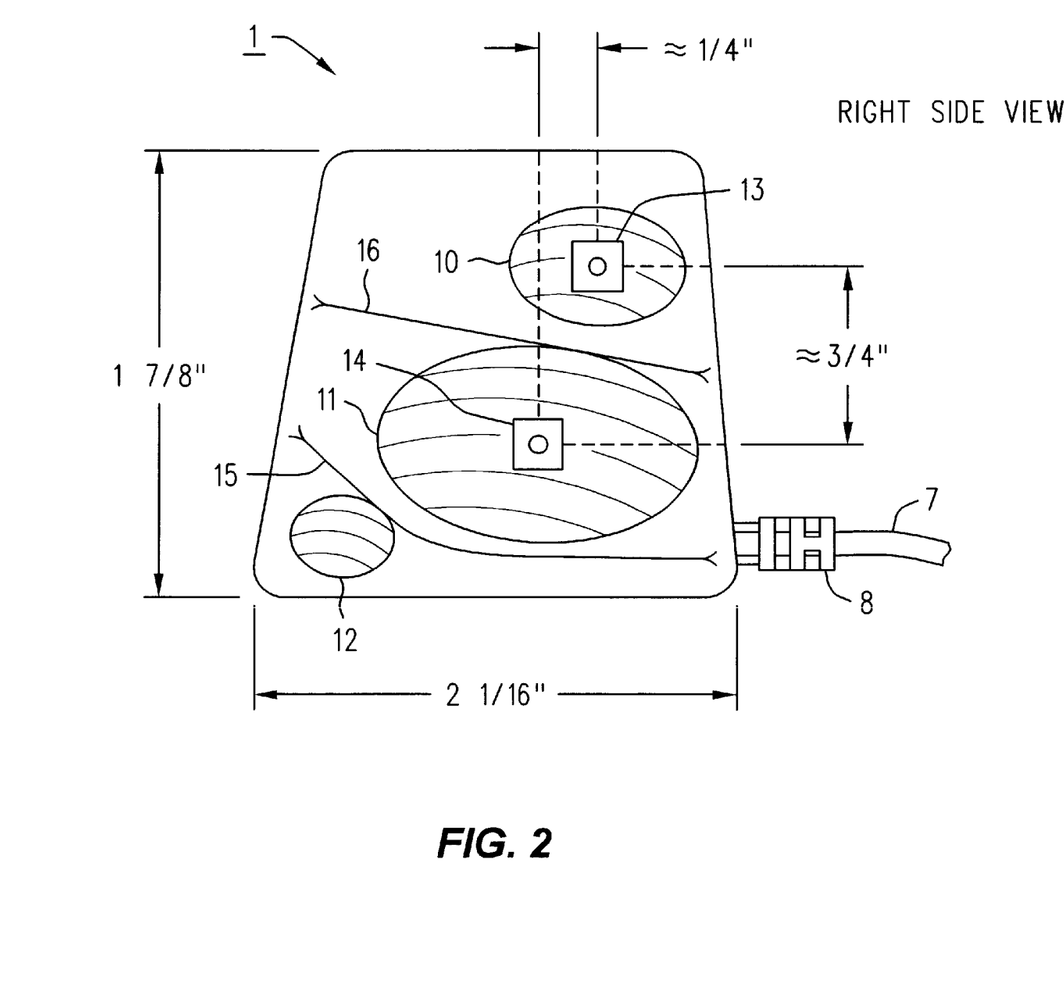
FIG. 2 is a right side view of the ergonomic mouse of FIG. 1.

Refer now to FIG. 2, which is a right side view of the mouse 1. The particular mouse 1 shown is a two button mouse, but it will be readily appreciated that it might as well be a single button or a three button mouse. The two mouse buttons (keys, or electrical switches) shown are denoted by reference numerals 13 and 14, and are located in respective slight concavities 10 and 11 which serve to locate and register the tips of the user's index and middle fingers, respectively. Note also the additional concavity, or depression, 12, which does the same for the user's third finger. This concavity 12 assists in allowing the user's little finger 9 to drag across the work surface, which in turn is useful as a point of applied force (or simply as a point of contact for judging the degree of force being applied and any resulting movement) during fine positioning of the mouse 1. If there were a third mouse button it could either be located in concavity 12, or in concavity 18 for the opposing thumb, shown in FIG. 3.

Note the dimensions shown: 2 1/16 inches in length and 1 7/8 inches in height. This is a small mouse!

Note also the vertical separation of mouse key 13 above mouse key 14 by approximately 3/4 inch. This matches the natural separation between the index and middle fingers, so there is no need to move a finger through any, let alone a large, angular displacement. Finally, note the approximately 1/4 inch horizontal displacement between mouse buttons 13 and 14. This accommodates the fact that the middle finger is longer than the index finger.

Figure 4:
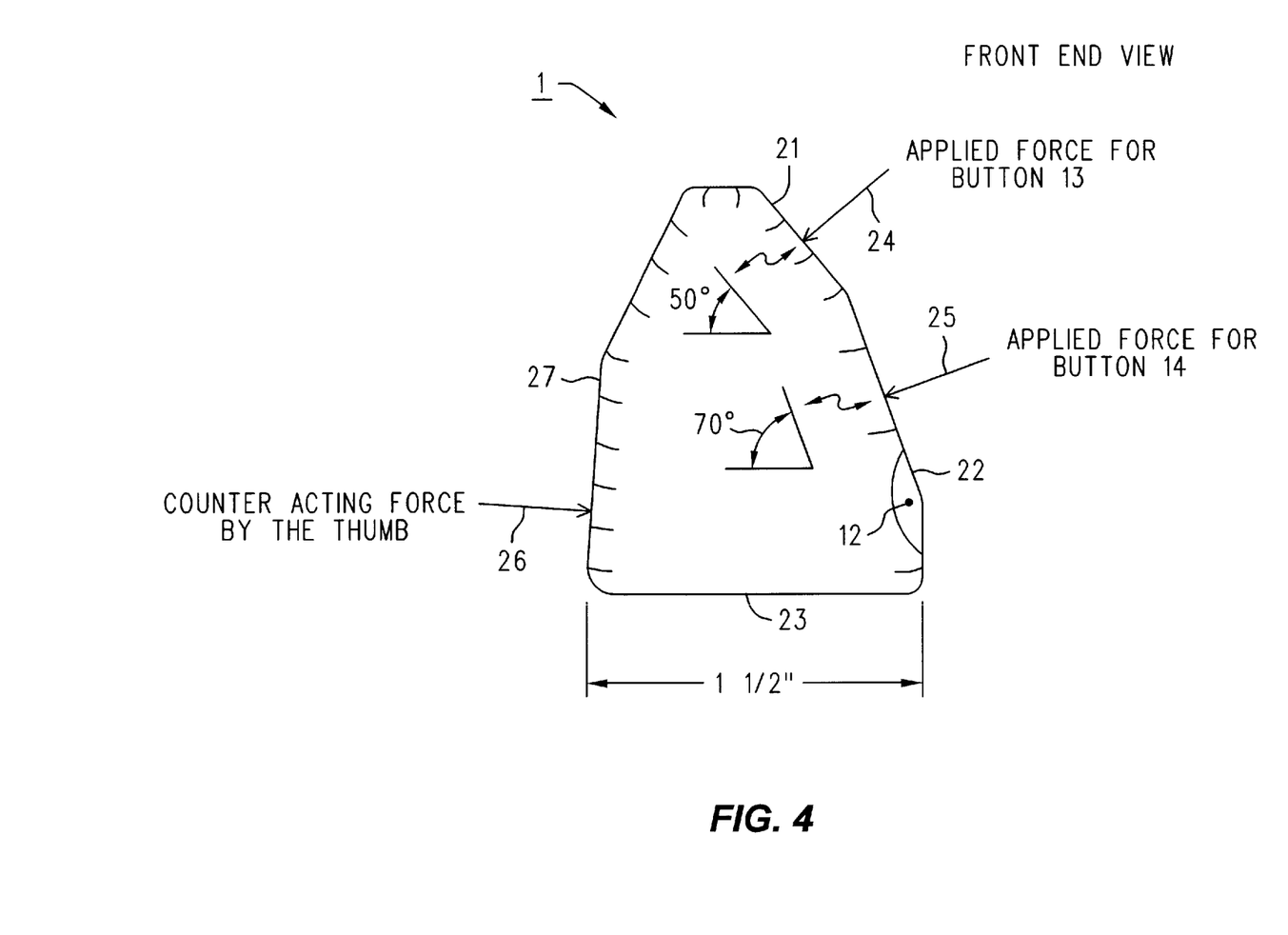
FIG. 4 is a front end view of the ergonomic mouse of FIG. 1.

From a brief reference to FIG. 4 it can be seen that the right side of the mouse 1 depicted in FIG. 2 may be inclined at different angles to the base of the mouse. Lines 15 and 16 in FIG. 2 represent this property.

Figure 3:
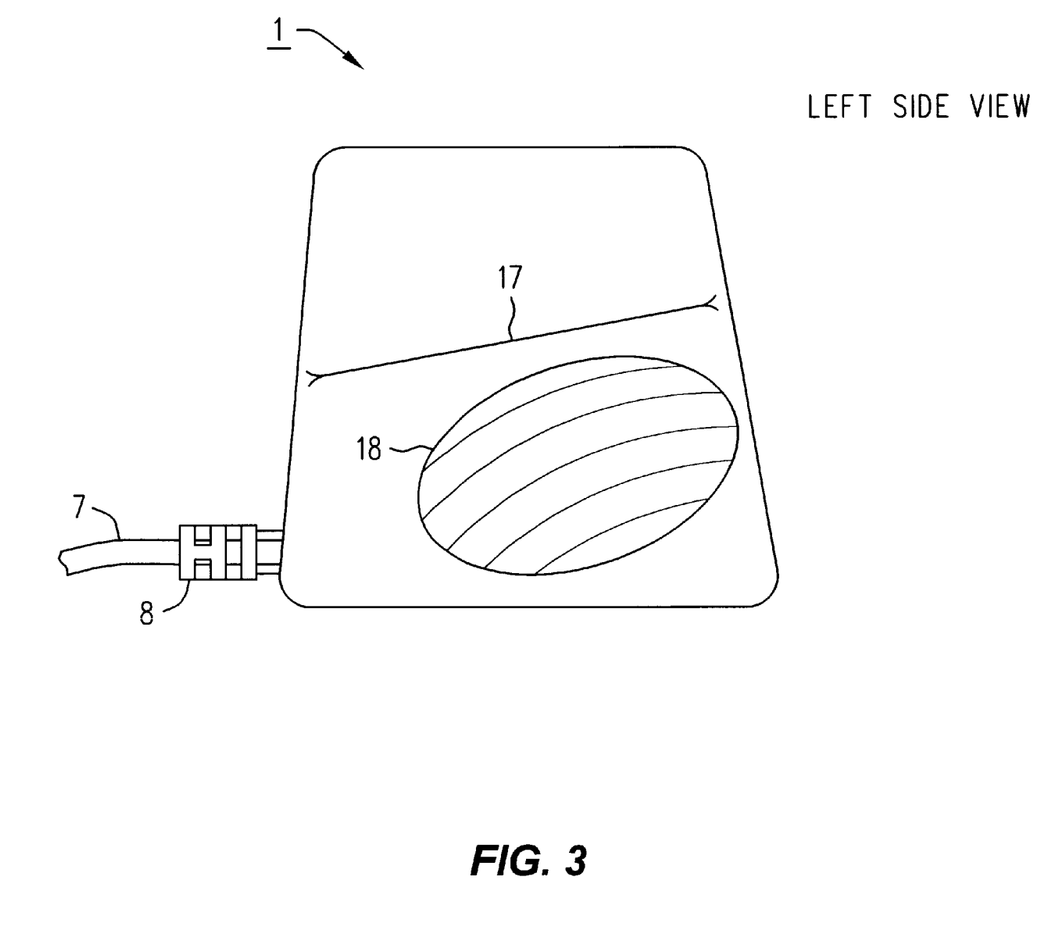
FIG. 3 is a left side view of the ergonomic mouse of FIG. 1.

Refer now to FIG. 3, which is a left side view of the mouse 1. Visible here are the indentation or concavity 18 that receives and locates the user's thumb, and a line 17 that also represents a change in surface angle (see FIG. 4).

Turning now to FIG. 4, which is a front end view of the mouse 1, it can readily be seen that the width of the mouse 1 is rather small as a mouse goes: only about 1½ inches. Note the surfaces 21 and 22. These are the regions of the right side view of FIG. 2 that are separated by lines 15 and 16. Each such region forms an angle with the base surface 23. In a preferred embodiment these angles are about 50° for surface 24 and about 70° for surface 22. Either angle could be different, however, and their range is preferably 30° to 90°, and most preferably 40° to 80°.

Note arrows 24 and 25. These represent the lines of action for forces applied by the finger tips to actuate mouse buttons 13 and 14, respectively. Notice how these lines of action are substantially not perpendicular to the base surface 23, although in our example they are each inclined toward it. These lines of action cooperate with a line of counter action 26 applied by the user's thumb as it resists a pinching action by one or more of the fingers to actuate a mouse button on the right side. The force represented by line 26 may become further inclined toward the base surface 23 if the user applies a sideways component of force into the indentation 18 for the thumb. If there were a mouse button located in the concavity 18 then the force represented by line 26 would be more than a simple counter force resisting forces from the right, and would involve actual movement of the thumb.

In any event, it will be appreciated that a pinching action is involved between the thumb and one or more of the fingers in order to actuate a mouse button. In addition to actuating the mouse button(s) this produces a slight resultant downward force toward the base surface 23, which in addition to the dragging little finger 9 (and possibly also the thumb and third finger), helps anchor the mouse 1 against undesired movement during such actuation.

Figure 5:
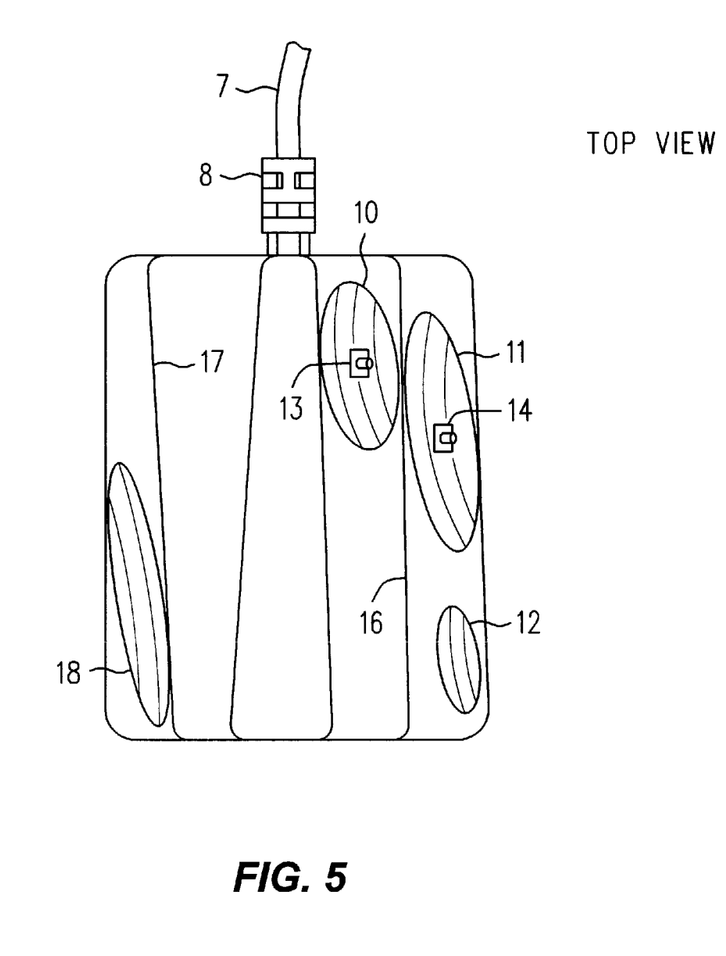
FIG. 5 is a top view of the ergonomic mouse of FIG. 1.
Figure 6:
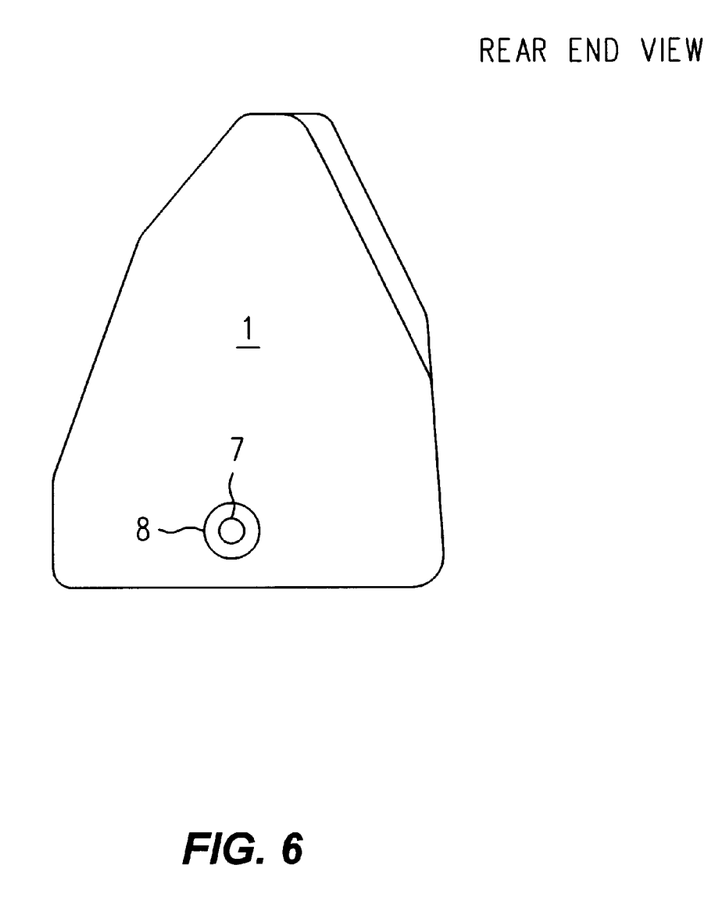
FIG. 6 is a rear end view of the ergonomic mouse of FIG. 1.

FIG. 5 is a top view of the mouse 1, while FIG. 6 is a rear end view. In view of the foregoing discussion, these views are believed to be self-explanatory.

Figure 7:
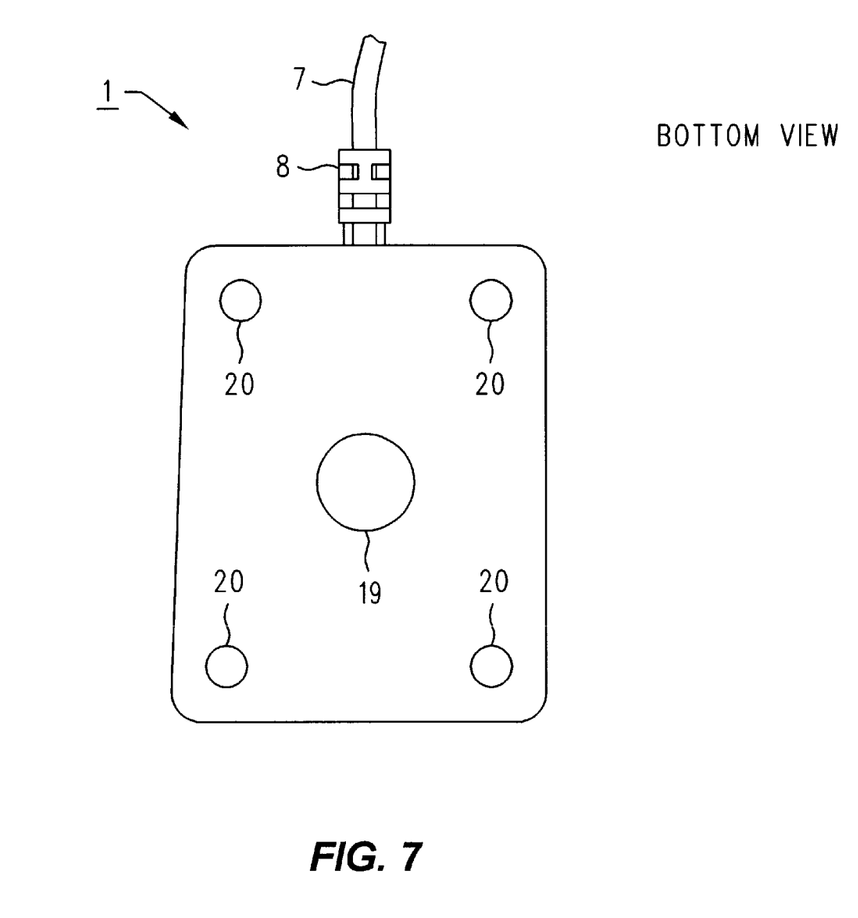
FIG. 7 is a bottom view of the ergonomic mouse of FIG. 1.

Finally, FIG. 8 is a bottom view of the mouse 1. Items 20 are optional low friction glides. Aperture 19 represents the location of what is preferably an optical motion sensing apparatus of the sort described in the incorporated Patents, although it must be confessed that other motion sensing mechanisms could be employed.

In conclusion, then, from an understanding of the foregoing it will be appreciated that mouse 1 is indeed an ergonomic mouse that alleviates mouse RSI, since its use allows the user's hand to rest in a natural position with the palm and wrist much less twisted than with a conventional mouse. The user's fingers are not required to extend into any contorted shapes, since the mouse fits naturally into the U-shaped region between the unflexed thumb and fingers of a hand resting comfortably upon a work surface.

What is claimed is:

1. A computer mouse comprising:
    a base surface for resting and sliding upon a work surface;
    a first gripping surface, adjoining the base surface at a first edge thereof, inclined thereto at an included angle of between 45° and 90° and providing a first location for a user's thumb to grip the mouse;
    a second gripping surface, adjoining the base surface at a second edge thereof generally opposite the first edge, inclined thereto at an included angle of between 30° and 90° and providing second and third locations for a user's index and middle fingers to grip the mouse, respectively;
    a first mouse button located at one of the second and third locations on the second gripping surface and having an axis of actuation that is substantially non-perpendicular to the work surface;
    the first and second gripping surfaces being inclined toward each other as distance above the base surface and away from the work surface increases and a pinching action of one of the user's index and middle finger towards the thumb to activate the mouse button causing a slight downward force on the mouse toward the work surface;
    the first a second edges being generally parallel and of sufficiently short lengths that the first and second gripping surfaces do not come into contact with the palm of the user's hand when the mouse is gripped with the user's thumb, index and middle fingers while the outside edge of the user's little finger and an adjoining outside edge of the palm of the hand are against the work surfaced.

2. A computer mouse as in claim 1 wherein the angle between the axis of actuation for the first mouse button and the work surface is less than 67.5°.

3. A computer mouse as in claim 1 wherein the shortest distance between the first and second edges is less than two inches.

4. A computer mouse as in claim 1 wherein an actuation point of the mouse button lies outward of a line equidistant between the first and second edges.

5. A computer mouse as in claim 1 wherein the second gripping surface further comprises a fourth location for the user's third finger to grip the mouse.

6. A computer mouse as in claim 1 wherein the first, second and third locations comprise concavities in their respective gripping surfaces.

7. A computer mouse as in claim 1 further comprising an optical motion sensing mechanism located in the base surface and responsive to movement across the work surface.

8. A computer mouse as in claim 1 wherein the first location is sufficiently close to the first edge of the base surface that the user's thumb can drag against the work surface.

9. A computer mouse as in claim 1 wherein the lengths of the first and second edges are less than two and one half inches.

* * * * *